United States Patent [19]

Berube et al.

[11] 4,429,336

[45] Jan. 31, 1984

[54] DISC DRIVE DYNAMIC SEAL

[75] Inventors: Normand A. Berube, North Andover; Pavel Otavsky, Southboro; Sigmund Hinlein, Sudbury; Thomas Wiseley, Acton, all of Mass.

[73] Assignee: Data General Corporation, Westboro, Mass.

[21] Appl. No.: 306,105

[22] Filed: Sep. 28, 1981

[51] Int. Cl.³ .................... G11B 23/04; G11B 25/04
[52] U.S. Cl. ................................................ 360/97
[58] Field of Search ............... 360/97, 98, 99, 133, 360/135, 137

[56] References Cited

U.S. PATENT DOCUMENTS

| 4,054,931 | 10/1977 | Bolton et al. | 360/97 |
| 4,130,845 | 12/1978 | Kulma | 360/97 |
| 4,249,221 | 2/1981 | Cox et al. | 360/97 |

FOREIGN PATENT DOCUMENTS 54-161303 12/1979 Japan .................... 360/97

*Primary Examiner*—Joseph A. Popek
*Attorney, Agent, or Firm*—Robert L. Dulaney

[57] ABSTRACT

A rigid magnetic disc memory apparatus having an aperture formed in the base such that contaminants from the bearings are removed before they can migrate into the vicinity of the discs. In a preferred embodiment the aperture is located in the region of high pressure created by a rotor and stator assembly. The pressure differential causes air and contaminants to flow out of the disc drive enclosure. The pressure differential across the aperture is increased by connecting a duct between the aperture and the inlet side of the clean air supply blower.

4 Claims, 4 Drawing Figures

DISC DRIVE DYNAMIC SEAL

BACKGROUND OF THE INVENTION

1. Field of the Invention

The present invention relates generally to memory apparatus for use in a data processing system and particularly to improved protection of rigid magnetic disc memory apparatus from particulate contamination originating from the area of the apparatus spindle bearings.

2. Description of the Prior Art

Magnetic disc drive memory apparatus usually have one or more rigid rotatable discs coated with a material which permits storage of data on and retrieval of data from the disc surface. To accomplish the "read" and "write" operations one or more recording heads are positioned adjacent to the disc surface. These heads "fly" on a thin layer of air generated by the rotating disc. Since the heads typically fly less than a micrometer above the disc surface, damage to the disc, the head, or both can result from particulate matter on the disc surface. Keeping the area surrounding the discs "clean" or free from particulate contamination has been a long standing problem in the field.

To minimize disc contamination, and thereby enhance reliability, discs are generally enclosed in substantially sealed housings which preclude the intrusion of ambient air. Air provided into the housing is passed through a filter designed to trap virtually all particles which could damage the disc or head before they enter the housing. This filter does not, however, solve the problem of particulate contamination of the discs in the housing caused by the spindle bearing. This bearing accommodates the shaft which functions to rotate the discs. Under high rotational speeds, contaminants, usually in the form of bearing lubricant mist, escape from the bearing. These contaminants typically migrate to the area surrounding the discs, where they can deposit and accumulate on the disc surface and eventually lead to "crashing", or contact of the read head with the particulates deposited on the disc surface. Crashing interferes with proper head operation and can lead to hardware damage.

To minimize contaminant migration into the disc area, magnetic disc apparatus commonly employ a "dynamic seal" between the area of the housing containing the discs and the spindle bearing. This dynamic seal is formed by a stator, or stationary member, and a rotor, a rotating member, adjacent thereto. During operation of the memory apparatus, a high pressure region results at the stator/rotor interface. This region discourages, but does not prevent, contaminant migration.

One method tried in the prior art to reduce mist contamination involves installation of a filter in the vicinity of the bearing. This results in a reduction of contaminants in the area of the discs, but does not provide adequate control.

Another prior art method is incorporation of a magnetic fluid seal between the rotor and stator. Because of the high rotational speed and large shaft diameter usually involved in a magnetic disc apparatus, this method is difficult to implement correctly.

The foregoing and other problems of the prior art are attended to by solutions described and embodied herein, as will be elaborated on hereinbelow.

SUMMARY OF THE INVENTION

The present invention relates to a rigid magnetic disc memory apparatus having a base, at least one disc mounted on a hub, apparatus for rotating the hub, bearing apparatus at the interface of the base and the rotating apparatus, a housing mounted on the base to form an enclosed volume containing the discs, apparatus for providing clean air into the housing volume, structure for inhibiting migration of contaminants from the bearing apparatus to the vicinity of the discs, and structure for removing the contaminants from the housing volume.

It is another feature of the present invention that the structure for removing the contaminants forms an aperture through the base, located such that contaminants inhibited by the inhibiting structure are exhausted.

It is a further feature of the present invention that the aperture, external to the enclosed volume, communicates with a filter, a check valve or by means of a duct, to the apparatus for providing clean air.

It is yet another feature that the structure for inhibiting migration is a stator and a rotor.

It is yet a further feature that the rotor has at least one vane mounted on the surface adjacent to the stator.

It is thus an object of the present invention to provide an improved digital computer system.

It is another object of the present invention to provide an improved and more reliable disc memory system for use in a data processing system, wherein contamination of the discs by particulates from outside of the "clean" disc area is substantially reduced.

Other objects and advantages of the present invention will be understood by those of ordinary skill in the art after referring to the detailed description of preferred embodiments and drawings wherein:

DESCRIPTION OF THE PREFERRED EMBODIMENT

Figure 1:
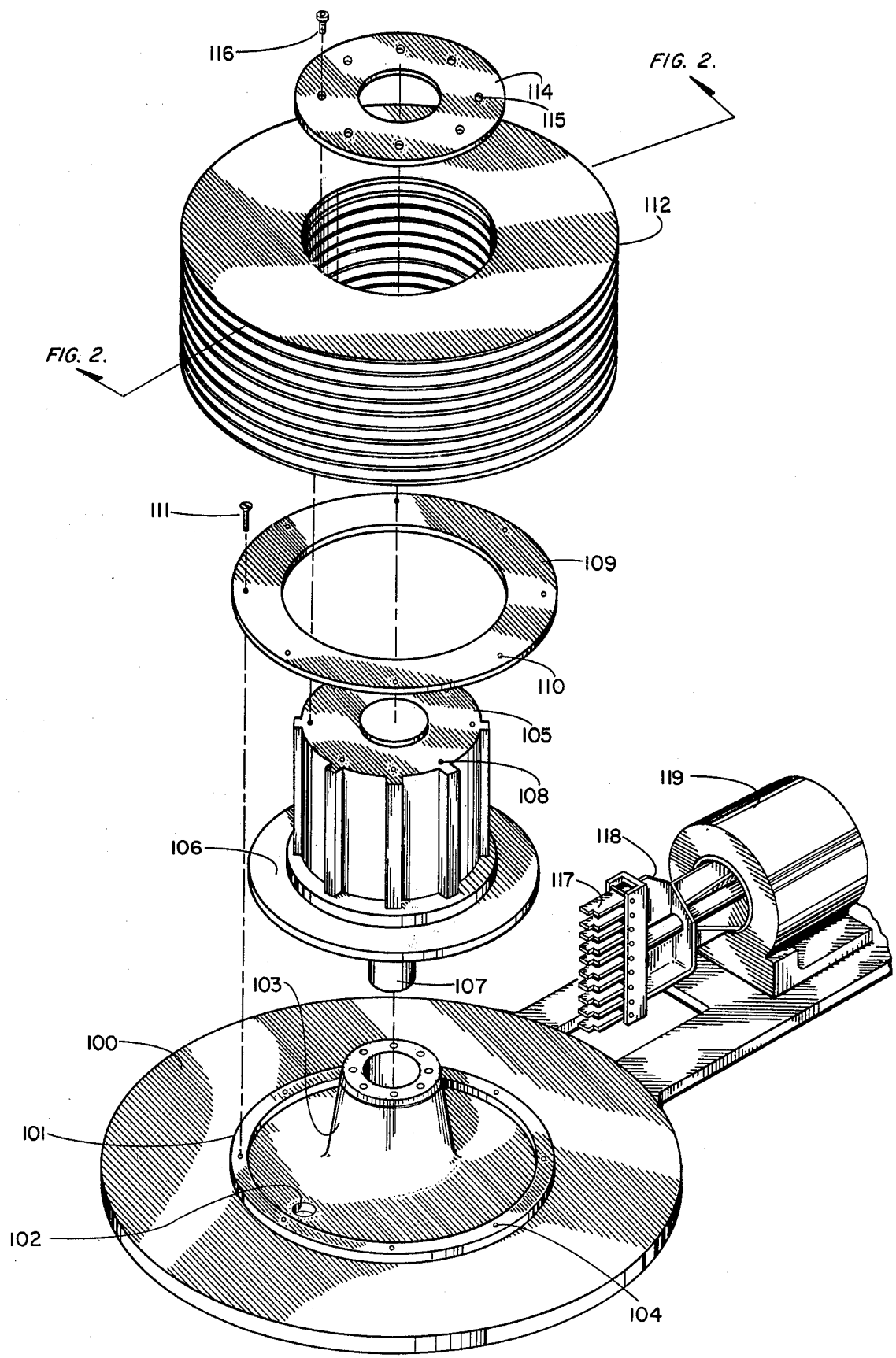
FIG. 1 is a partially exploded view of certain major components of a magnetic disc apparatus.

Referring to FIG. 1, a partially exploded view of major components of a magnetic disc drive is presented. Base 100 has ring segment 101, aperture 102 and protruding segment 103 formed therein. Ring segment 101 has a plurality of holes therein for receiving screws 111. Rotor element 106 is mounted onto the lower surface of hub 105. Shaft 107 extends from hub 105 and mates with the aperture in protruding segment 103. Stator element 109 has a plurality of holes 110 corresponding to holes 104 and is mounted to ring segment 101 by a like plurality of fasteners 111, only a typical one of which is shown for simplicity.

A plurality of rigid magnetic discs 112, separated from each other by separation elements 113, are slidbly mounted on hub 105 and held in place by retaining element 114. Element 114 has a plurality of holes 115, corresponding to a like plurality of holes 108 in hub 105, such that element 114 can be mounted to hub 105 by a like plurality of fasteners 116, only a typical one of which is shown for simplicity.

Information is stored on and read from discs 112 by circuitry and wiring (not shown) attached to and extending from head arms 117, which are mounted on head arm carriage 118. To position the circuitry in the proper location on the surface of discs 112, carriage 118 is driven radially, relative to the axis of rotation of the discs 112, by motor 119.

Figure 2:
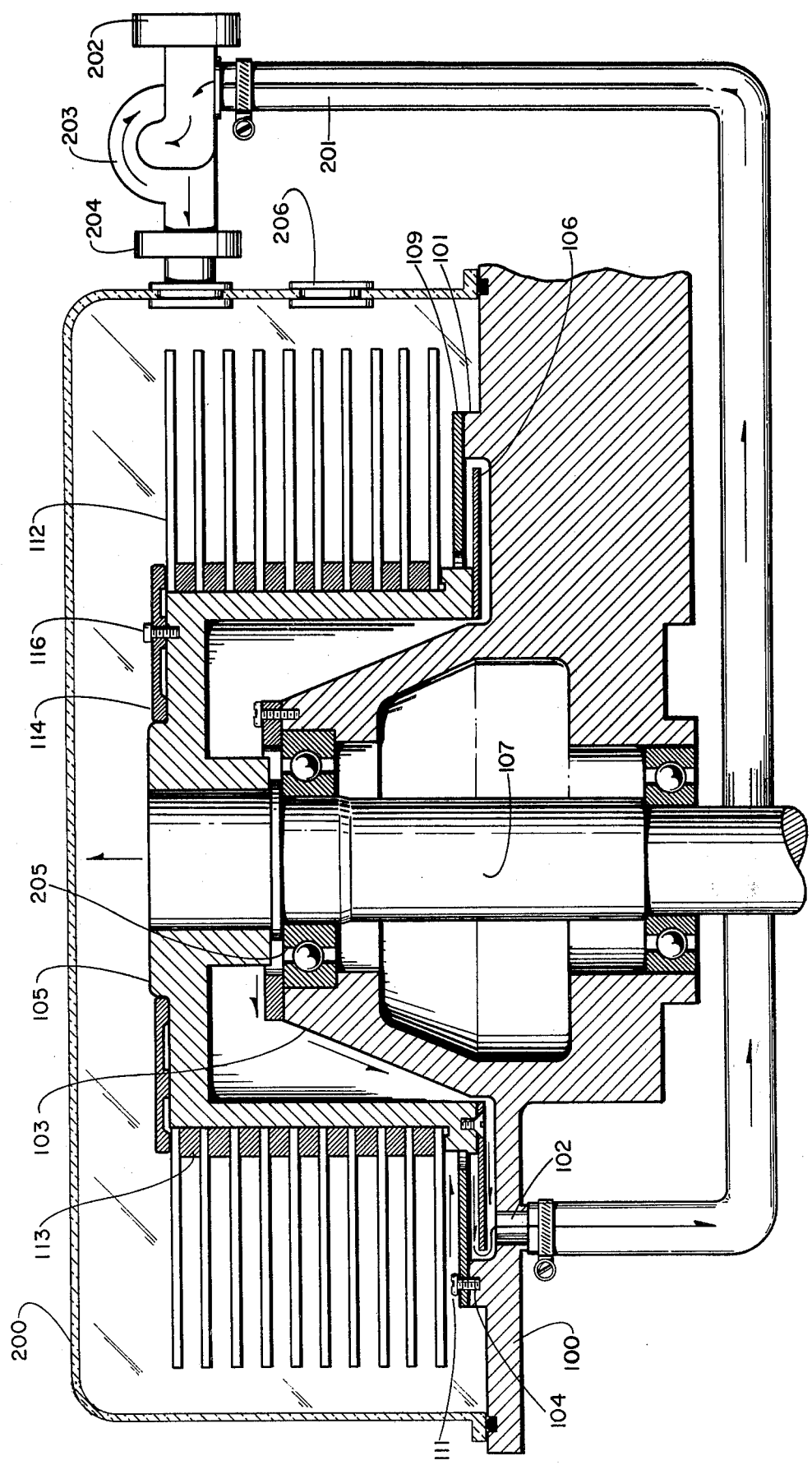
FIG. 2 is a vertical cross section view of a magnetic disc apparatus.

Referring to FIG. 2, a cross section view of a disc drive apparatus is shown. Discs 112 and other major components are shown as being inside of housing 200. Housing 200 and base 100 form a substantially sealed enclosed volume. Blower assembly 203 draws ambient air through prefilter 202, accelerates it, and forces it through filter 204 into the enclosure. This air is "clean" and is substantially free of particulate matter which can cause head or disc damage. Most of the air introduced into housing 200 by blower assembly 203 exits through check valve 206. Some air, as explained below, exits through aperture 102.

As presented in FIG. 2, hose 201, filters 202 and 204, check valve 206, and blower assembly 203 are schematic representations and are not drawn to scale with regard to the components within housing 200. In a preferred embodiment of the invention the air volume entering blower assembly 203 through filter 202 is the primary sorce of air for housing 200 and is many times larger than the air volume entering through hose 201.

Base 100, ring segment 101, and stator 109 form a channel into which rotor 106 extends from hub 105. As hub 105 rotates during disc drive operation, centrifugal "pumping" of the air occurs and a region of high pressure is created in the space near the outer edge of rotor element 106. Aperture 102, located slightly inside of ring segment 101 in the region of high pressure, provides a flow path for air to exit from the enclosed volume. Because of the pressure gradient, a net air flow occurs in the directions indicated by the arrows. The lubricant mist generated by bearing 205 is carried through aperture 102 along with the air flow and a "seal" is effected between discs 112 and the lubricant mist.

Of course, in addition to the air flow indicated in FIG. 2, there is also a rotational air flow pattern into and out of the plane of FIG. 2 caused by the spinning of discs 112. When the contaminants have migrated into the area between rotor 106 and base 100, they will be discouraged from moving into the area between rotor 106 and stator 109 by the local pressure differential. Instead, the contaminants will be carried with the rotational air flow until they pass over aperture 102 and are exhausted. For this reason, the preferred embodiment of the invention requires only a single aperture to remove substantially all contaminants generated by bearing 106.

Aperture 102 is connected to the intake side of blower assembly 203 by duct or hose 201. The suction applied to hose 201 by the action of blower assembly 203 increases the pressure differential across aperture 102, thereby enhancing the effectiveness of aperture 102 in removing contaminants. In addition, despite the presence of the particulates, the air removed from the disc drive apparatus via aperture 102 is much cleaner than typical room air and, therefore, may be safely introduced "downstream" from filter 202. Any contaminants from aperture 102 will be removed by filter 204.

To approach 100 percent effectiveness in removing contaminants, aperture 102 must have a certain minimum cross sectional area. Of course, the selection of the specific aperture area depends on a wide range of factors such as the misting characteristics of the bearing, the air pressure differential in the vicinity of the rotor, the thickness of the base, and the pressure differential across the aperture. In the preferred embodiment of the invention shown in FIG. 2, a cross sectional area of 0.6 inches was found to be adequate to virtually eliminate bearing-related contaminants in the area of discs 112.

Figure 3:
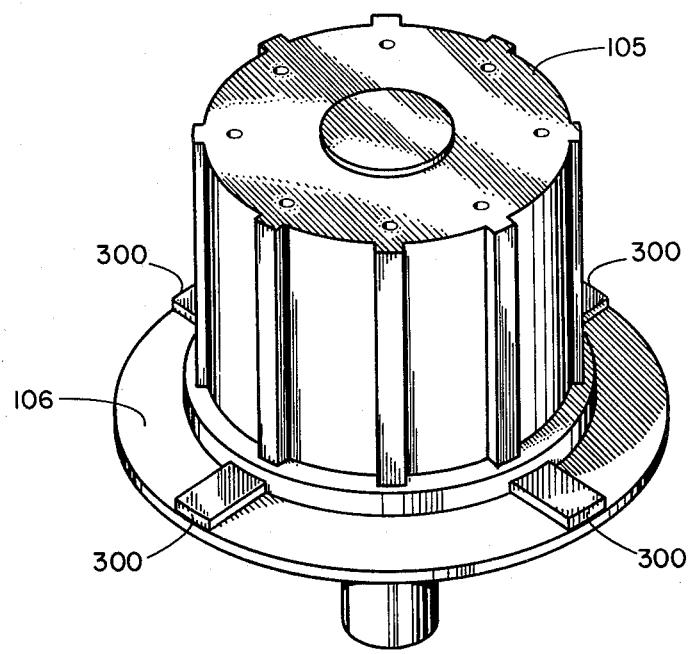
FIG. 3 is a perspective view of the rotatable hub and seal rotor showing vanes mounted on the seal rotor surface.
Figure 4:
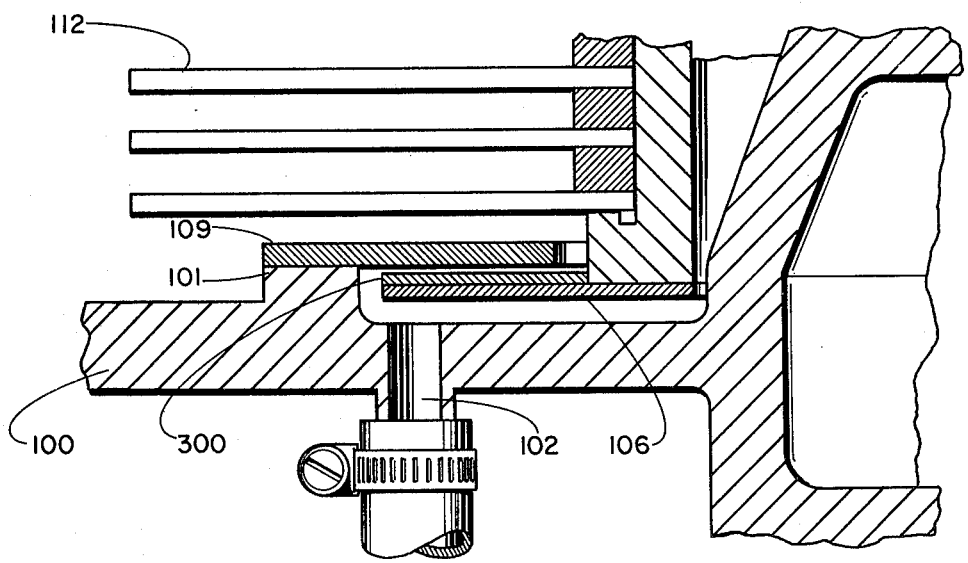
FIG. 4 is a portion of the cross-sectional view as shown in FIG. 2, but with the addition of a vane on the seal rotor.

Referring to FIG. 3, hub 105 is shown with the addition of a plurality of equally distributed "vanes" 300 mounted on rotor 106. FIG. 4 presents a cross sectional view of the disc drive of FIG. 2 incorporating vanes 300. Vanes 300 create an impeller action during disc drive operation and greatly enhance the centrifugal "pumping" of rotor 106, thereby substantially increasing the air pressure in the region near the outer edge of rotor 106. This higher pressure operates to further discourage any intrusion of contaminants from bearing 205 into the vicinity of discs 112.

The invention may be embodied in yet other specific forms without departing from the spirit or essential characteristics thereof. For example, the air from aperture 102 could be exhausted to ambient by replacing hose 201 with a check valve or a filter connected to aperture 102.

The present embodiments are therefore to be considered in all respect as illustrative and not restrictive. The scope of the invention is indicated by the appended claims rather than by the foregoing description, and all changes which come within the meaning and range of equivalency of the claims are therefore intended to be embraced therein.

We claim:

1. Memory apparatus comprising:
   a base having an aperture formed therein;
   a housing mounted on said base such that an enclosed volume is defined;
   means for providing clean air into said enclosed volume, said air providing means including blower means;
   at least one magnetic disc internal to said enclosed volume;
   hub means internal to said enclosed volume for holding said at least one magnetic disc;
   rotation means rotatably mounted through said base for spinning said hub means;
   bearing means for rotatably connecting said base and said rotation means;
   means for inhibiting migration within said enclosed volume of contaminants from said bearing means to the vicinity of said at least one disc; and
   means for applying suction to said aperture, whereby removal of contaminants from said enclosed volume is enhanced.

2. The memory apparatus of claim 1 wherein said suction applying means comprises
   duct means connected at one end to said base and at the other end to the inlet side of said blower means such that said blower means applies a suction to said aperture.

3. The memory apparatus of claim 1 wherein said migration inhibiting means comprises:
   a ring segment protruding from said base;
   a disc-shaped stator attached at its outer periphery to said ring segment and having a central opening for accommodating said hub and extending substantially parallel to said base; and a disc-shaped rotor attached to said hub and extending outward from said hub between and substantially parallel to said base and said stator and wherein said aperture is located beneath said stator and adacent said ring segment.

4. The memory apparatus of claim 3 wherein said migration inhibiting means further comprises at least one vane element attached to the rotor surface which is adajcent to said stator, whereby the operation of said migration inhibiting means is enhanced.

* * * * *